United States Patent [19]

Okuyama

[11] 4,398,764
[45] Aug. 16, 1983

[54] AIR BALANCE PANEL FOR VEHICLES

[75] Inventor: Teiji Okuyama, Toyota, Japan

[73] Assignee: Aisin Seiki Kabushiki Kaisha, Kariya, Japan

[21] Appl. No.: 298,582

[22] Filed: Sep. 2, 1981

[30] Foreign Application Priority Data

Sep. 8, 1980 [JP] Japan .............................. 55-124422

[51] Int. Cl.³ ............................................ B62D 37/02
[52] U.S. Cl. ...................................... 296/15; 293/117
[58] Field of Search ................... 296/15, 91; 293/117

[56] References Cited

U.S. PATENT DOCUMENTS 3,884,516 5/1975 Gallion et al. ...................... 293/117
4,131,308 12/1978 Holka et al. ........................ 296/15

FOREIGN PATENT DOCUMENTS 2017023 9/1979 United Kingdom ................. 296/15

Primary Examiner—Robert R. Song
Attorney, Agent, or Firm—Oblon, Fisher, Spivak, McClelland & Maier

[57] ABSTRACT

An air balance panel for vehicles which includes an air balance panel integrally and unitarily formed with a vehicle bumper which is made of plastic and which further includes a flexible portion and a drive mechanism operatively connected to the air balance panel for acting on the flexible portion of the air balance panel according to a predetermined signal. The air balance panel also includes an arm member operatively connected to the drive mechanism for acting on the flexible portion of the air balance panel. Also included are link members interposed between the arm member and the air balance panel for transmitting driving force from the drive mechanism to the air balance panel.

7 Claims, 4 Drawing Figures

AIR BALANCE PANEL FOR VEHICLES

BACKGROUND OF THE INVENTION

1. Field of the Invention

The present invention relates to an air balance panel and, more particularly, to an air balance panel for vehicles.

2. Description of the Prior Art

An air balance panel for vehicles is known which is adapted to a vehicle body for reducing air resistance generated upon high speed running of the vehicle and for thus improving the fuel efficiency of the vehicle.

SUMMARY OF THE INVENTION

An object of the present invention is to provide an improved air balance panel for vehicles which further reduces the aforementioned air resistance and further improves the fuel efficiency of the vehicle in operation.

A further object of the present invention is to provide an improved air balance panel for vehicles which is integrally formed with a flexible portion to a vehicle bumper made of plastic.

A still further object of this invention is to provide an improved air balance panel for vehicles which is relatively simple and includes only a minimum number of parts.

In accordance with the present invention, an air balance panel for vehicles is provided which includes an air balance panel integrally formed with a vehicle bumper which is made of plastic and which further includes a flexible portion and a drive mechanism integrally connected to the air balance panel for acting on the flexible portion of the air balance panel according to a predetermined signal.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENT

Figure 1:
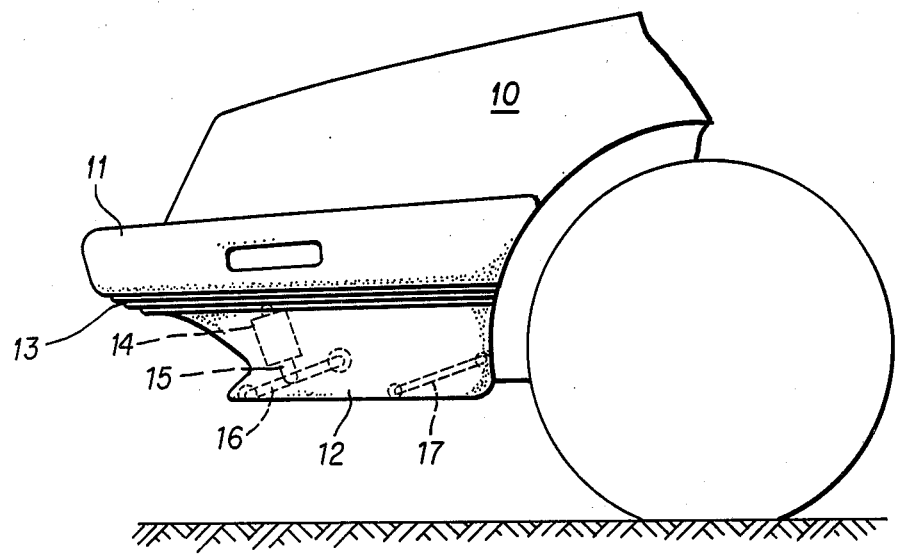
FIG. 1 is a side view which shows a preferred embodiment of an air balance panel for vehicles according to the present invention.
Figure 2:
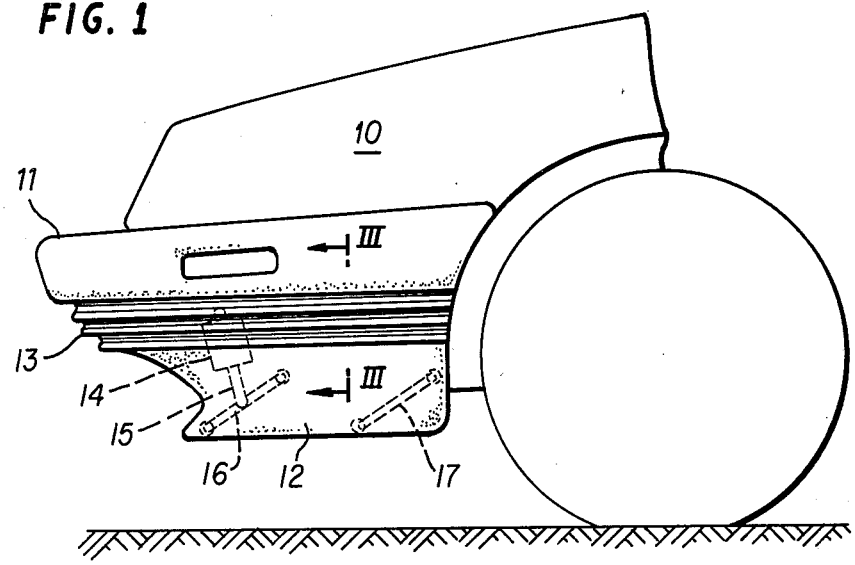
FIG. 2 is an explanatory view of the actuation of the air balance panel in FIG. 1.

Referring now to FIGS. 1 and 2, reference numeral 10 denotes a vehicle body. A bumper 11 made of plastic is adapted for mounting on a front surface of vehicle body 10 for absorbing and relieving shock upon collision.

Reference numeral 12 indicates an air balance panel according to the present invention and is integrally and unitarily formed with bumper 11 to form a one piece assembly for reducing air resistance upon high speed running of the vehicle. Air balance panel 12 is provided with a bellows-type flexible portion 13 and is vertically expandable and contractable.

In FIG. 2 reference numeral 14 denotes a drive mechanism such as, for example, a motor, etc. and is disposed within body 10. An arm 15 is operatively connected to one end of drive mechanism 14. Link members 16, 17 are disposed within the air balance panel 12.

An end portion of arm 15 is pivotally supported nearly at the center of one link member 16. Respective ends of link members 16, 17 are pivotally supported on the side of the body 10 and respective other ends thereof are pivotally supported on a lower and inward side of air balance panel 12.

Figure 4:
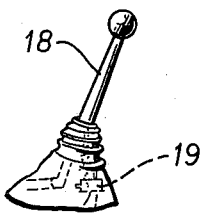
FIG. 4 is a perspective view showing a shift lever.
Figure 3:
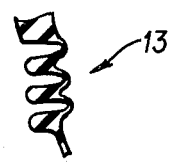
FIG. 3 is a sectional view taken along line III—III in FIG. 2.

Drive mechanism 14 is driven, for example, so as to be responsive as to whether shift lever 18 is located in a high speed range position and thus in contact with switch element 19 which senses the vehicle speed and which controls operation of drive mechanism 14 when switch element 19 engages with the base portion of shift lever 18 when lever 18 is shifted in a counterclockwise direction in FIG. 4 during high vehicle speed operation. At this position arm 15 is expanded by drive mechanism 14 and the respective ends of link members 16, 17 are downwardly depressed. Accordingly, flexible portion 13 of air balance panel 12 is expanded as shown in FIGS. 2 and 3. It can be easily understood that drive mechanism 14 is driven, for example, so as to be responsive to the speed of a speedometer or similar control mechanism operatively associated with switch element 19.

By the foregoing, there has been disclosed a preferred form of air balance panel for vehicles constructed in accordance with the present invention. It will be appreciated that various additions, substitutions, modifications and omissions may be made thereto without departing from the spirit of the invention.

What is claimed as new and desired to be secured by Letters Patent of the United States is:

1. An air balance panel for vehicles having a bumper, comprising
    an air balance panel integrally and unitarily formed with said vehicle bumper which comprises plastic and which further comprises an expandable flexible portion for integrally interconnecting said air balancing panel with said vehicle bumper; and
    drive means operatively connected to said air balance panel for acting on said expandable flexible portion of said air balance panel according to a predetermined signal.

2. An air balance panel for vehicles as set forth in claim 1 further comprising:
    an arm member operatively connected to said drive means for acting on said flexible portion of said air balance panel.

3. An air balance panel for vehicles as set forth in claim 2 further comprising:
    first and second link members interposed between said arm member and said air balance panel for transmitting driving force from said drive means to said air balance panel.

4. An air balance panel for vehicles as set forth in claim 1 wherein said drive means further comprises a motor.

5. An air balance panel for vehicles as set forth in claim 1 further comprising speed sensory means mounted on said vehicle wherein said drive means is driven in response to operation of said speed sensing means.

6. An air balance panel for vehicles having a bumper comprising:

an air balance panel integrally and unitarily formed with said vehicle bumper which comprises plastic and which further comprises a vertically expandable and contractable flexible portion for integrally interconnecting said air balancing panel with said vehicle bumpers;

drive means operatively connected to said air balancing panel for acting on said vertically expandable and contractable flexible portion of said air balance panel according to a predetermined signal.

7. An air balance panel for vehicles as set forth in claim 6, wherein said flexible portion further comprises a bellows-type expandable and contractable flexible portion.

* * * * *